April 20, 1965 E. PELL 3,179,930
CIRCUIT CONDITION INDICATING SYSTEMS
Filed March 28, 1961 3 Sheets-Sheet 1

Inventor
Eric Pell
By Wm A Auter
Attorney

April 20, 1965        E. PELL        3,179,930
CIRCUIT CONDITION INDICATING SYSTEMS
Filed March 28, 1961        3 Sheets-Sheet 3

Fig.6

Inventor
Eric Pell
By Wm. A. Autio
Attorney

United States Patent Office 3,179,930
Patented Apr. 20, 1965

3,179,930
CIRCUIT CONDITION INDICATING SYSTEMS
Eric Peil, Wauwatosa, Wis., assignor to Cutler-Hammer, Inc., Milwaukee, Wis., a corporation of Delaware
Filed Mar. 28, 1961, Ser. No. 98,956
18 Claims. (Cl. 340—213)

This invention relates to indication systems and more particularly to systems for indicating operating conditions of any one or more of a plurality of electrical control elements such as protective devices or the like in electrical control networks.

While not limited thereto, the invention is especially applicable to indication of faults or abnormal conditions in electrical power control systems, as for example, indication of open conditions of overload contacts connected in series in undervoltage relay circuits in plural motor control systems and the like, the invention being also applicable to indication of open conditions of electrically isolated contacts.

Richard J. Byrnes' copending application Serial No. 722,344, filed March 18, 1958, now Patent No. 3,011,162, dated November 28, 1961, and assigned to the assignee of this invention, discloses a fault indicator which employs two-coil relays. This invention comprises improvements thereover.

An object of the invention is to provide improved indication systems.

A more specific object of the invention is to provide improved miniature fault indicator devices having a plurality of monitoring and control features.

Another specific object of the invention is to provide improved miniature fault indicators employing long lasting static components to adapt the same for potting in setting material.

According to the invention, there are provided fault indicators affording visual indications of abnormal conditions occurring in electrical systems. The indicators afford a light indication of both normal and abnormal conditions. Provision is made for optional flag indications of the memory type to indicate the first opening contact of a series thereof and to maintain such indication if power is disconnected until the indicator is reset. Provision is made for selectively resetting each individual indicator of a group thereof and for alternatively resetting all the indicators of a group thereof in unison. The indicators are of the transistorized static type adapted for potting in setting material and are of a small size. The indicators are of a modified flip-flop type and are provided with inherent time delay means to afford operation thereof from one-half wave alternating current power and to avoid undesired response to discontinuities in the supply voltage wave.

The above mentioned and other objects and advantages of the invention and the manner of obtaining them will become more apparent and the invention itself will best be understood by reference to the following description of embodiments thereof taken in conjunction with the accompanying drawings, wherein.

Figure 1:
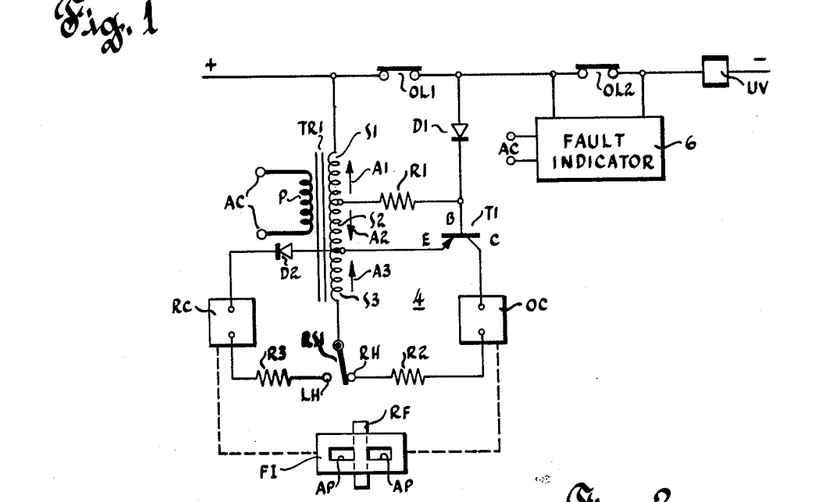
FIGURE 1 diagrammatically shows an indicating system having a flag indicator constructed in accordance with the invention.

Referring to FIG. 1, there is shown a system for indicating operating conditions of a plurality of electrical control elements. The electrical control elements for exemplary purposes are shown as overload relay contacts OL1 and OL2 connected in series with an operating coil of an undervoltage relay UV across a direct current power supply source, the latter being represented by positive and negative symbols. The aforementioned indicating system comprises a plurality of indicator control circuits 4 and 6 connected across contacts OL1 and OL2, respectively. Indicator control circuit 6 is similar to circuit 4 and has been shown schematically as a rectangle to avoid complicating the drawing. While two contacts OL1 and OL2 have been shown in series connection, it will be apparent that any number of such contacts and corresponding indicator control circuits may be similarly provided as desired. It will also be apparent that the contacts such as OL1 and OL2 to be monitored by indicator control circuits need not be connected in series but may be connected in parallel or electrically isolated from one another. The indicator control circuits or fault finders hereinafter described are capable of monitoring contacts regardless of their connections.

Indicator control circuit 4 is provided with operating energy from alternating current supply source AC which is connected across primary winding P of a power supply transformer TR1. Transformer TR1 is provided with three secondary windings S1, S2 and S3. Secondary windings S1 and S3 are wound in a direction to afford voltages thereacross in the same direction, as indicated by arrows A1 and A3, whereas secondary winding S2 is wound in a direction to afford a voltage thereacross in the opposite direction, as indicated by arrow A2, for each alternate half-cycle of the alternating current supply, such as for example, each positive half-cycle. For each negative half-cycle of the supply, the voltages across the respective secondary windings reverse directions.

Indicator control circuit 4 is provided with means for operating and for resetting an indicator FI of the flag type or the like. The operating means comprises a flag indicator direct current operating coil OC and a controllable semi-conductor device such as a transistor T1 of the P-N-P conductivity type or the like. The resetting means comprises a flag indicator direct current resetting coil RC and a resetting switch RS1.

Transistor T1 is provided with means for maintaining the same in its non-conducting condition. This means comprises a bias voltage circuit supplied from secondary winding S1 of the transformer TR1. To this end, the upper end of winding S1 is connected to the junction between the positive side of the direct current source and contact OL1 and the other side of contact OL1 is connected through a unidirectionally conducting device such as a diode D1 and a resistor R1 in series to the lower end of the winding S1.

Transistor T1 is provided with means for rendering the same conducting when the bias voltage is disconnected. This means comprises an input voltage circuit supplied from secondary winding S2 of the transformer TR1. To this end, the lower end of winding S2 is connected through the emitter-base junction E–B of transistor T1 and resistor R1 in series to the upper end of winding S2.

Operating coil OC of indicator FI is supplied with energizing current from secondary winding S3 of transformer TR1. To this end, the upper end of winding S3 is connected through the emitter-collector junction E–C of transistor T1, coil OC, resistor R2 and right-hand stationary contact RH and the movable contactor of resetting switch RS1 in series to the lower end of winding S3.

Resetting coil RC of indicator FI is supplied with energizing current from secondary winding S3 of transformer TR1 when resetting switch RS1 is actuated. To this end, the upper end of winding S3 is connected through a unidirectional conducting device such as a diode D2, coil RC, resistor R3 and left-hand stationary contact LH and the movable contactor of switch RS1 to the lower end of winding S3.

Indicator FI is of the flag or semaphore type known as the Emico (Electro Mechanical Instrument Company) front panel mounting Flag Type "S" circuit indicator. Indicator FI is provided with a pair of apertures AP normally having a white background visible therethrough. A red flag RF is provided for rotation behind the apertures when operating coil OC is energized. The indicator Type "S" is of the memory type wherein the red flag remains behind the apertures and visible therethrough until resetting coil RC is energized.

Figure 2:
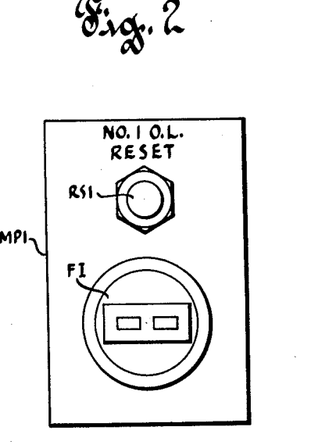
FIG. 2 shows the front face of a mounting panel for the indicating system of FIG. 1.

As shown in FIG. 2, a mounting panel MP1 is provided for each indicator control circuit 4 and 6. Indicator FI is mounted at the lower portion of the panel and extends therethrough for viewing from the front thereof. Resetting switch RS1 is preferably of the pushbutton type or the like and is mounted at the upper portion of panel MP1 and extends therethrough. Switch RS1 is preferably of the spring return type whereby the movable contactor thereof engages stationary contact LH when the pushbutton is pressed and the return spring restores the movable contactor into engagement with stationary contact RH thereof as shown in FIG. 1 when the pushbutton is released.

The operation of indicator control circuit 4 in FIG. 1 will now be described. Let it be assumed that direct current power is applied across the circuit to be monitored so that direct current flows through contacts OL1 and OL2 to energize the operating coil of undervoltage relay UV. Relay UV is usually provided with contacts (not shown) which close to control a controlled device when its operating coil is energized. Contacts OL1 and OL2 may be the usual overload relay contacts which are normally closed and open when abnormal conditions such as excessive currents occur in the power connections to the controlled device.

Let it also be assumed that alternating current power is applied from supply conductors AC to primary winding P of transformer TR1. On each positive half-cycle of the supply voltage, current flows from the upper end of secondary winding S1 through contact OL1, diode D1 and resistor R1 to the lower end of winding S1. On each such positive half-cycle, a voltage is applied from secondary winding S2 to render emitter E of transistor T1 positive relative to base B thereof which normally would render the transistor conducting. However, the current flow through resistor R1 causes a voltage drop thereacross which is of opposite polarity to the voltage of secondary winding S2 in the circuit loop comprising resistor R1, winding S2 and emitter E and base B of transistor T1. This voltage of opposite polarity renders emitter E of transistor T1 negative relative to base B thereof. The voltage drop in diode D1 is relatively small. The voltage drop across resistor R1 is applied across the emitter-base junction E-B of transistor T1 in opposition to the control voltage applied from secondary winding S2 across emitter-base junction E-B thereof to maintain the transistor T1 non-conducting. For this purpose, it will be apparent that the voltage supplied by winding S1 must be higher such as 12 volts than the voltage such as 10 volts supplied by winding S2. This voltage maintains emitter E of transistor negative relative to base B thereof so that the transistor will not conduct current in its emitter-collector circuit.

In the event of an abnormal condition such as an overload occurring in the controlled device causing opening of contact OL1, the aforementioned current flow through resistor R1 is interrupted. As a result, the voltage from winding S2 becomes effective to render transistor T1 conducting. This causes current flow from the upper end of winding S3 through emitter E and collector C of transistor T1, coil OC, resistor R2 and stationary contact RH and the movable contactor of switch RS1 to the lower end of winding S3 to energize coil OC. Coil OC rotates red flag RF ninety degrees behind apertures AP to be visible therethrough and thereby to indicate the abnormal condition.

To reset the indicator, that is, to restore red flag RF to the position shown in FIG. 1, it is necessary that contact OL1 be first closed. When the abnormal condition is corrected and contact OL1 closed, current flow through contact OL1, diode D1 and resistor R1 causes transistor T1 to be switched to its non-conducting state. This causes coil OC to be deenergized. However, red flag RF remains in its actuated position behind apertures AP to be visible therethrough as a memory indication. To reset red flag RF into its normal position shown in FIG. 1, resetting switch RS1 is actuated so that the movable contactor thereof engages stationary contact LH. As a result, current flows from the upper end of winding S3 through diode D2, coil RC, resistor R3 and stationary contact LH and the movable contactor of switch RS1 to the lower end of winding S3 to energize coil RC. Coil RC actuates red flag RF back to its position shown in FIG. 1.

Diode D1 is provided to prevent damaging direct current from flowing from the positive side of the direct current source through secondary windings S1 and S2, emitter-base junction E-B, contact OL2 and the operating coil of relay UV to the negative end of conductor 2 when contact OL1 opens. Diode D2 is provided to prevent current from flowing in the reverse direction through switch RS1, resistor R3 and coil RC on alternate negative half-cycles of the alternating current supply voltage and thereby prevents reactuation of red flag RF to its indicating position when switch RS1 is pressed.

When the alternating current supply voltage reverses on each negative half-cycle, the voltages across secondary windings S1, S2 and S3 also reverse from the directions shown by arrows A1, A2 and A3. However, indicator control circuit 4 prevents such reversal of the voltages from interfering with proper operation thereof. When the voltage across winding S1 reverses, when contact OL1 is closed, diode D1 prevents current flow through resistor R1 and contact OL1. When contact OL1 is open, such reversal of voltage across winding S1 can effect no current flow because the circuit is open. When the voltages across windings S2 and S3 reverse, the voltage from winding S2 causes emitter E to go negative relative to base B to render transistor T1 non-conducting and the latter prevents reverse conduction through coil OC in response to the reversed voltage across winding S3 regardless of whether contact OL1 is closed or open. Consequently, transistor T1 conducts only on the positive half-cycles when contact OL1 opens.

Typical values for the circuit components in FIG. 1 may be as follows: Resistor R1 may have a value of 160,000 ohms. Resistors R2 and R3 may each have a resistance of 5,000 ohms. The voltage across secondary winding S1 may be 12 volts whereas the voltage across each secondary winding S2 and S3 may be 10 volts.

Figure 3:
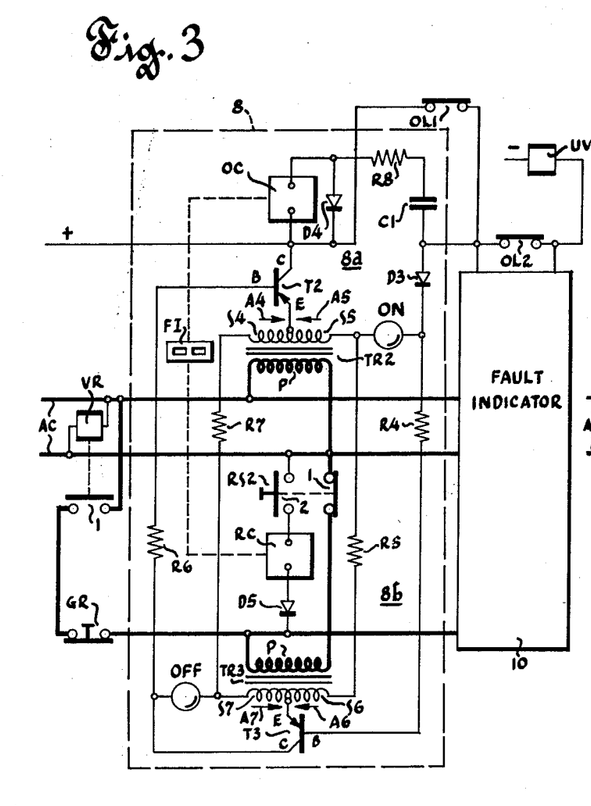
FIG. 3 diagrammatically shows an indicating system having light indicators and an optional flag indicator constructed in accordance with the invention.

Referring to FIG. 3, there is shown an indication system providing light indications of abnormal conditions and also having provision for flag indications of the type hereinbefore described to indicate an initial fault of a plurality of faults in a series circuit. FIG. 3 shows a circuit to be monitored similar to that in FIG. 1 and having a series connection from the positive side of the direct current power supply source through contacts OL1 and OL2 and the operating coil of undervoltage relay UV in that order to the negative side of the source. The indication system comprises a plurality of fault indicators or indicator control circuits 8 and 10 connected across contacts OL1 and OL2, respectively. Indicator control circuit 10 is similar to circuit 8 and has been shown schematically as a rectangle to avoid duplication.

Indicator control circuit 8 is provided with operating energy from an alternating current supply source represented by a pair of power supply conductors AC. Indicator control circuit 8 comprises a first portion 8a affording a visual signal to indicate that contact OL1 is closed and a second portion 8b affording a visual signal to indicate that contact OL1 is open. As will become apparent from the following description of operation, first and second portions 8a and 8b are arranged in the form of a modified flip-flop arrangement operable from one-half wave alternating current having thermal time control therein whereby operation of one portion prevents operation of the other portion.

To supply operating power to first portion 8a of the indicator control circuit there is provided a first transformer TR2 having a primary winding P connected across conductors AC and having two secondary windings S4 and S5. To supply operating power to second portion 8b of the indicator control circuit, there is provided a second transformer TR3 having a primary winding P connected through a normally open contact 1 of a voltage relay VR, a normally closed group resetting switch GR and a normally closed contact 1 of a resetting switch RS2 across conductors AC and having two secondary windings S6 and S7. Secondary windings S4 and S5 are wound in directions to afford voltages thereacross in opposite directions as indicated by arrows A4 and A5 for each alternate half-cycle of the source, such as for example, each positive half-cycle. Similarly, secondary windings S6 and S7 are wound in directions to afford voltages thereacross in opposite directions as indicated by arrows A6 and A7 for each correspondiing half-cycle of the source. Primary windings P of transformers TR2 and TR3 are connected across conductors AC in phase so that for each positive half-cycle of the source the voltages across secondary windings S4, S5, S6 and S7 will be in phase as shown by the arrows adjacent thereto.

Indicator control circuit 8 is provided in its first portion 8a with control means for operating a visual indicator such as a contact-closed indication or "on" lamp ON and for preventing operation of a visual indicator such as a contact-open indication or "off" lamp OFF. This control means comprises a controllable semi-conductor device such as a transistor T2 of the P–N–P conductivity type or the like, a unidirectionally conducting diode D3, the thermal time constant of the filament of lamp ON and resistors R4 and R5 connecting lamp ON to second portion 8b of the circuit for blocking purposes.

Indicator control circuit 8 is provided in its second portion 8b with control means for operating lamp OFF and for preventing operation of lamp ON. This control means comprises a controllable semi-conductor device such as a transistor T3 of the P–N–P conductivity type or the like, the thermal time constant of the filament of lamp OFF, resistors R6 and R7, a voltage relay VR, a group resetting switch GR and a contact 1 of a resetting switch RS2.

In portion 8a of indicator control circuit 8, the right-hand end of secondary winding S4 of transformer TR2 is connected to emitter E of transistor T2 and the left-hand end of such winding is connected through resistor R7, lamp OFF and resistor R6 in series to base B of transistor T2 to supply the latter with operating control voltage at its emitter-base junction. The left-hand end of secondary winding S5 of transformer TR2 is connected to emitter E of transistor T2 and collector C of the latter is connected to the junction between the positive side of the direct current source and contact OL1 and then through contact OL1, diode D3 and lamp ON to the right-hand end of winding S5 to afford a load circuit for the transistor.

In portion 8b of indicator control circuit 8, the left-hand end of secondary winding S6 of transformer TR3 is connected to emitter E of transistor T3 and the right-hand end of such winding is connected through resistor R5, lamp ON and resistor R4 to base B of transistor T3 to supply the latter with operating control voltage at its emitter-base junction. The right-hand end of secondary winding S7 of transformer TR3 is connected to emitter E of transistor T3 and collector C of the latter is connected through lamp OFF to the left-hand end of winding S7 to afford a load circuit for the transistor. The operating coil of relay VR is connected across conductors AC.

Indicator control circuit 8 is also provided with a flag indicator FI like the flag indicator shown in FIGS. 1 and 2 which may be employed to indicate an initial fault of a plurality of faults in a series circuit. Flag indicator FI comprises a direct current operating coil OC and a direct current resetting coil RC similar to those in FIG. 1. Flag indicator FI is provided with control means comprising a resistor R3, a capacitor C1, unidirectionally conducting devices such as diodes D4 and D5 and a normally open contact 2 on resetting switch RS2. Operating coil OC, resistor 8 and capacitor C1 are connected in that order across contact OL1 from the junction between the positive side of the direct current source and contact OL1 to the other side of contact OL1. Diode D4 is connected across operating coil OC in a direction to block current flow therethrough in shunt of operating coil OC from the direct current source and to pass current in the other direction to conduct discharge current from capacitor C1 in shunt of operating coil OC when contact OL1 is reclosed. Contact 2 of resetting switch RS2, resetting coil RC and diode D5 are connected in that order from the lower conductor AC to the junction between primary winding P of transformer TR3 and group resetting switch GR and then through switch GR and contact 1 of relay VR to the upper conductor AC for resetting flag indicator FI.

Figure 5:
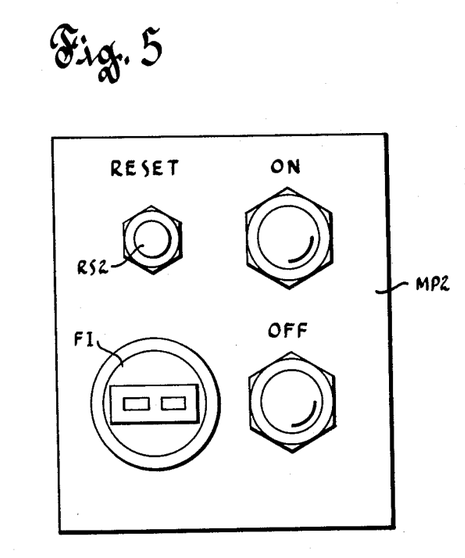
FIG. 5 shows the front face of a mounting panel for the indicating systems of FIGS. 3 and 4.

As shown in FIG. 5, a mounting panel MP2 is provided for each indicator control circuit 8 and 10. Lamp ON is mounted above lamp OFF on the right-hand side of the panel and resetting switch RS2 is mounted above flag indicator FI on the left-hand side of the panel. Switch RS2 may be of the pushbutton spring-return type similar to switch RS1 hereinbefore described. Each additional indicator control circuit such as circuit 10 may be provided with a similar control panel.

The operation of indicator control circuit 8 in FIG. 3 will now be described. Let it be assumed that direct current power is applied across the circuit to be monitored so that direct current flows from the positive side of the source through contacts OL1 and OL2 and the operating coil of relay UV to the negative side of the source to energize relay UV. Let it also be assumed that alternating current power is applied across conductors AC to energize primary winding P of transformer TR2. On each positive half-cycle of the supply voltage, secondary winding S5 of transformer TR2 applies a positive voltage as indicated by arrow A5 on emitter E of transistor T2 relative to collector C thereof. On the same positive half-cycles, secondary winding S4 of transformer TR2 applies a positive operating control voltage as indicated by arrow A4 on emitter E of transistor T2 relative to base B thereof to render the transistor conducting. The circuit for the operating control voltage extends through resistors R6 and R7 and lamp OFF. As a result, current flows in the transistor load circuit extending from the left-hand end of winding S5 through emitter E and collector C of transistor T2, contact OL1, diode D3 and lamp ON to the right-hand end of winding S5 to energize and light lamp ON. This energization of lamp ON causes the resistance thereof to increase due to heating of its filament. The voltage drop across the hot lamp ON is applied through resistor R4 to base B of transistor T3 and through resistor R5 and winding S6 to emitter E of transistor to render emitter E negative relative to base B thereby to bias transistor T3 off and to prevent conduction thereof.

The aforementioned application of alternating current power across conductors AC causes energization of voltage relay VR to close contact 1 thereof. This completes a circuit through contact 1 of relay VR, group resetting switch GR and contact 1 of resetting switch RS2 to energize primary winding P of transformer TR3 across conductors AC. On each positive half-cycle of the supply voltage, secondary winding S7 of transformer TR3 applies a positive voltage as indicated by arrow A7 on emitter E of transistor T3 relative to collector C thereof. On the same positive half-cycles, secondary winding S6 of transformer TR3 applies a positive operating control voltage as indicated by arrow A6 on emitter E of transistor T3 relative to base B thereof. However, this operating control voltage is opposed by the aforementioned negative bias voltage applied to emitter E from lamp ON to maintain transistor T3 non-conducting or to limit current flow from winding S7 through emitter E and collector C and lamp OFF to a small amount so that lamp OFF will at the most have only a dim glow.

The purpose of relay VR and its contact 1 is to provide an initial time delay between the energization of transformer TR2 and the energization of transformer TR3 following application of power to conductors AC. This time delay is provided by the time required to energize relay VR and to close its contact 1. Such time delay causes transistor T2 to be rendered conducting first and to block conduction of transistor T3 as hereinbefore described provided contact OL1 is closed before operating voltages are applied from transformer TR3 to transistor T3.

Lamp ON being lighted and lamp OFF being extinguished or having a dim glow indicates that contact OL1 is closed.

When the alternating supply voltage reverses on each alternate half-cycle so that a negative half-cycle is applied to transformers TR2 and TR3, the voltages across secondary windings S4, S5, S6 and S7 also reverse from those indicated by arrows A4, A5, A6 and A7. This causes transistors T2 and T3 to be rendered non-conducting. Relay VR being an alternating current relay, contact 1 thereof remains closed. If the control circuits of transistors T2 and T3 had identical parameters so that each transistor would respond at the same rate, either transistor might be rendered conducting on the next positive half-cycle of the supply voltage. However, to prevent transistor T3 from being rendered conducting as long as contact OL1 remains closed, means are provided for affording discrimination between portions 8a and 8b of the indicator control circuit. This means comprises the filaments of lamps ON and OFF having a positive temperature coefficient of resistance. The resistance of a hot lamp is many times larger than the resistance of a cold lamp. Therefore, the blocking voltage applied from lamp ON to transistor T3 is larger than any blocking voltage applied from lamp OFF to transistor T2. As the thermal time constant of lamp ON prevents complete cooling of its filament in the time intervals between positive half-cycles of the supply voltage, that is, during the alternate negative half-cycle periods when transistor T2 is rendered non-conducting, the indicator control circuit will lock in a condition wherein lamp ON is lit and lamp OFF is extinguished when contact OL1 is closed and will remain in this condition until the alternating current power is disconnected. The indicator control circuit will also lock in a condition wherein lamp OFF is lit and lamp ON is extinguished when contact OL1 is opened and will remain in such condition until resetting switch RS2 or group resetting switch GR is pressed or the alternating current power is disconnected, as hereinafter described.

Figure 6:
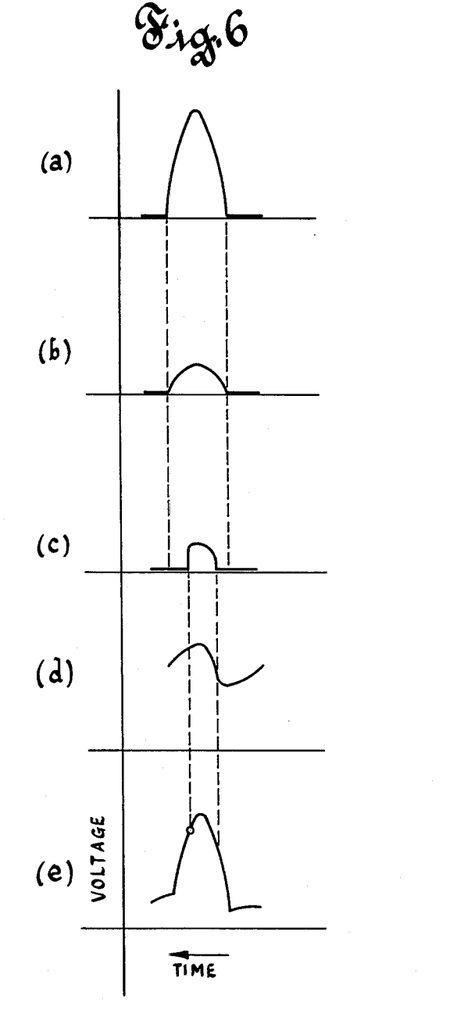
FIG. 6 graphically shows operating characteristics of the systems of FIGS. 3 and 4.

The operating characteristics of lamps ON and OFF are graphically shown in FIG. 6(a) and (b). The curve in FIG. 6(a) shows the voltage across the bright lamp such as the voltage across lamp ON when contact OL1 is closed. The curve in FIG. 6(b) shows the voltage across the dim lamp such as the voltage across lamp OFF when contact OL1 is closed. As will be apparent from the curve in FIG. 6(a), the amplitude of the blocking voltage applied from lamp ON to transistor T3 is significantly large to maintain transistor T3 substantially non-conducting. The small current flow from the right-hand end of secondary winding S7 of transformer TR3 through emitter E and collector C of transistor T3 and lamp OFF to the left-hand end of winding S7 affords a voltage across lamp OFF having a substantially smaller amplitude as shown in FIG. 6(b). As a result, the negative bias voltage applied from lamp OFF through resistor R7, winding S4 and resistor R6 to the emitter-base junction E–B of transistor T2 is insufficient to block transistor T2. As hereinbefore mentioned, the secondary windings of transformers TR2 and TR3 are wound in proper directions so that the large blocking voltage across lamp ON and the small and ineffective voltage across lamp OFF are in phase.

In the event of an abnormal condition causing opening of contact OL1 to deenergize the operating coil of relay UV and to cause interruption of the load circuit of transistor T2, lamp ON is deenergized and extinguished. As a result, the negative bias (or blocking) voltage previously applied from lamp ON to transistor T3 is removed. Consequently, the aforementioned positive voltage indicated by arrow A6 applied from secondary winding S6 to transformer TR3 across the emitter-base junction of transistor T3 on each positive half-cycle of the supply source renders transistor T3 conducting. Current flows from secondary winding S7 through emitter E and collector C of transistor T3 and lamp OFF to energize and light the lamp thereby to indicate that contact OL1 is open. A negative blocking voltage is applied from lamp OFF through resistor R7 and winding S4 and resistor R6 across the emitter-base junction of transistor T2 to maintain the latter non-conducting. As the thermal time constant of lamp OFF prevents complete cooling of its filament in the time intervals between positive half-cycles of the source voltage, the indicator control circuit will lock in a condition wherein lamp OFF is lit and lamp ON is extinguished and will remain in such condition even if contact OL1 is reclosed. This is for the reason that now the voltage across lamp OFF has a large amplitude as shown by the curve in FIG. 6(a) which counteracts the voltage across winding S4 and effectively prevents conduction in transistor T2 or limits conduction therein after reclosure of contact OL1 to a very small and ineffective value so that the voltage across lamp ON has a small amplitude as shown in FIG. 6(b).

After the abnormal condition is corrected and contact OL1 closed, the indicator control circuit may be reset in its original condition by momentarily depressing resetting switch RS2. This causes opening of contact 1 of the resetting switch to interrupt energization of primary winding P of transformer TR3 to extinguish lamp OFF. As a result, the blocking voltage previously applied from lamp OFF to the emitter-base junction of transistor T2 is removed. The voltage indicated by arrow A4 across secondary winding S4 of transformer TR2 then becomes effective to render transistor T2 conducting and to relight lamp ON. The negative bias voltage from lamp ON is then reapplied to the emitter-base junction of transistor T3 to maintain the latter non-conducting.

In electrical systems, at times a fault or abnormal condition at a particular point may introduce an overload or fault at one or more other points. In such case, it is desirable to know which of the fault indicators operated first. An indication of the fault indicator which operated first is afforded by flag indicator FI shown in FIGS. 3 and 4. It will be apparent that only the first contact to open of a series of contacts OL1, OL2, etc., causes operation of its associated flag indicator. Assuming that contact OL1 opens first, the pulse of current which charges capacitor C1 causes actuation of the respective flag indicator. Subsequent opening of contact OL2 does not introduce another current pulse in the direct current circuit because capacitor C1 is already charged and remains charged so long as contact OL1 remains open. Thus, the flag indicator indicates which fault indicator operated first.

Let it be assumed that indicator FI is in its normal position exhibiting a white background as shown in FIG. 3. When contact OL1 is closed, operating coil OC is shunted thereby to maintain the operating coil deenergized. When contact OL1 opens as hereinbefore described, a pulse of direct current flows from the positive side of the direct current source through operating coil OC, resistor R3, capacitor C1, contact OL2 and the operating coil of relay UV to the negative side of the source to charge capacitor C1. This current pulse energizes operating coil OC to rotate the red flag of indicator FI ninety degrees behind the apertures to be visible therethrough. When capacitor C1 charges, the current flow in the aforementioned circuit decreases to deenergize operating coil OC. The red flag seen through the apertures of indicator FI indicates that contact OL1 is open. The charge on capacitor C1 prevents operation of the flag indicator of indicator control circuit 10 in the event contact OL2 thereafter opens.

When contact OL1 is reclosed, capacitor C1 discharges through resistor R8, diode D4 and contact OL1. Diode D4 provides a bypass path for the capacitor discharge current in shunt of operating coil OC to prevent resetting of indicator FI by reverse current flow through coil OC. The red flag remains behind the apertures until indicator FI is reset.

To reset indicator FI back to its normal condition, resetting switch RS2 is momentarily pressed to close contact 2 thereof and to open contact 1 thereof. The effect of opening contact 1 has been described heretofore. Contact 2 completes a circuit from the lower conductor AC through resetting coil RC, diode D5, group resetting switch GR and contact 1 of relay VR to the upper conductor AC to energize resetting coil RC with half-wave current rectified by diode D5. As a result, coil RC rotates the red flag of indicator FI back to its normal position shown in FIG. 1. Indicator FI then exhibits the white background indication to show that contact OL1 is closed. It will be apparent that indicator FI is of the memory type and maintains its red indication until it is reset by pressing switch RS2.

Figure 4:
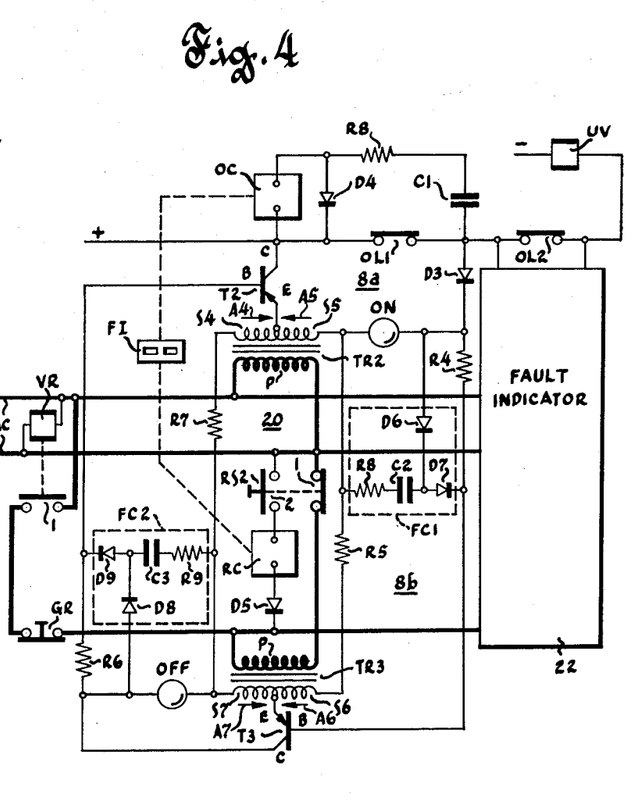
FIG. 4 diagrammatically shows an indicating system having light indicators and an optional flag indicator similar to FIG. 3 but modified to afford improved blocking action.

FIG. 4 shows a modified indicator system. Indicator control circuits 20 and 22 of FIG. 4 are similar to indicator control circuits 8 and 10 in FIG. 3 except for the addition of filter circuits FC1 and FC2 to afford improved blocking action on one transistor when the other transistor is operatively conducting. Reference characters similar to those in FIG. 3 have been shown in FIG. 4 for like elements.

Filter circuit FC1 is provided with a unidirectionally conducting device such as a diode D6, a capacitor C2 and a resistor R8 connected in series in that order across lamp ON, that is, from the junction between diode D3 and lamp ON to the junction between lamp ON and secondary winding S5. A unidirectionally conducting device such as a diode D7 is connected from the junction between diode D6 and capacitor C2 to the junction between resistor R4 and base B of transistor T3.

In a similar manner, filter circuit FC2 is provided with a like unidirectionally conducting diode D8, a capacitor C3 and a resistor R9 connected in series in that order across lamp OFF, that is, from the junction between collector C of transistor T3 and lamp OFF to the junction between lamp OFF and secondary winding S7. A like unidirectionally conducting diode D9 is connected from the junction between diode D8 and capacitor C3 to the junction between resistor R6 and base B of transistor T2.

The operation of the system of FIG. 4 will now be described. Let it be assumed that transistor T2 is conducting and lamp ON is lit. Let it also be assumed that relay VR is energized and that its contact 1 is closed. As transistors are not precisely functioning devices but vary in their individual characteristics, improved blocking action is afforded by filter circuit FC1. This improved blocking action permits a wider latitude or variation in other circuit parameters such as the ohmic values of the resistors in the indicator control circuits.

During each positive half-cycle of the alternating supply voltage, transistor T2 conducts and current flows through lamp ON to light the same as hereinbefore described. During such positive half-cycles, current also flows through diode D6 and resistor 8 to charge capacitor C2 in shunt of lamp ON at a relatively fast rate as shown by the rising portion (right to left) of the curve in FIG. 6(d). Diode D7 prevents current flow through resistor R4 to capacitor C2. The curve in FIG. 6(d) graphically depicts the blocking voltage applied by capacitor C2 to the emitter-base junction E-B of transistor T3, the time axes in FIG. 6 being from the right to the left. The curve in FIG. 6(c) graphically depicts the voltage across the dim lamp such as lamp OFF when contact OL1 is closed and lamp ON is lit. The curve in FIG. 6(e) graphically depicts the voltage across lamp ON and also the voltage across secondary winding S6 of transformer TR3 which tends to render transistor T3 conducting during the positive half-cycle of the supply voltage. It will be apparent that when the voltage across secondary winding S6 shown in FIG. 6(e) exceeds the voltage across capacitor C2 shown in FIG. 6(d), transistor T3 conducts a small current to cause a small voltage shown in FIG. 6(c) across the dim lamp OFF. Diode D7 prevents the base current of transistor T3 from charging capacitor C2. However, on the latter portion of the positive half-cycle, when the voltage across secondary winding S6 shown in FIG. 6(e) decreases below the blocking voltage, FIG. 6(d), supplied by capacitor C2, transistor T3 is cut off from conduction. This cut off point is illustrated in FIG. 6(c) wherein the left-hand trailing edge of the voltage pulse across lamp OFF abruptly decreases to zero.

The improved blocking action afforded by the filter circuits in FIG. 4 is illustrated by comparison of the curves in FIGS. 6(c) and 6(b). The curve in FIG. 6(c) is the voltage across the dim lamp when the filter circuit is used as in FIG. 4 and the curve in FIG. 6(b) is the voltage across the dim lamp when the filter circuit is not used as in FIG. 3 and only the increased resistance of the hot lamp is relied on for blocking the other transistor. It will be apparent that the pulse in FIG. 6(c) is much narrower than the pulse in FIG. 6(b) which shows that the filter circuit provides better blocking action. During each alternate negative half-cycle of the supply voltage when transistors T2 and T3 are rendered non-conducting, capacitor C2 discharges at a relatively slower rate through diode D7, resistor R4, lamp ON and resistor R8. Resistor R4 limits the discharge current. Diode D6 prevents discharge of capacitor C2 in shunt of resistor R4. However, capacitor C2 does not discharge completely during such negative half-cycle as shown by the lowest point of the curve in FIG. 6(d) and therefore maintains a blocking voltage on transistor T3 during each negative half-cycle. It will be apparent that this blocking voltage is effective to completely block conduction of transistor T3 from the left-hand trailing edge of the pulse in FIG. 6(c) through the succeeding negative half-cycle and until the next positive half-cycle when the voltage across secondary winding S6 of transformer TR3 shown in FIG. 6(e) again exceeds the blocking voltage applied by capacitor C2 shown in FIG. 6(d). The filter circuit, therefore, insures proper operation of lamp ON even if the thermal time constant of such lamp is extremely small.

When contact OL1 opens due to an abnormal condition, lamp ON is extinguished as hereinbefore described. Capacitor C2 discharges in the aforementioned circuit. As a result of the discharge of capacitor C2, the blocking voltage is removed and transistor T3 is rendered conducting to light lamp OFF. The discharge time of capacitor C2 might introduce a small delay between the extinguishing of lamp ON and the lighting of lamp OFF but any such delay is insignificant. Following opening of contact OL1 and conduction of transistor T3 to light lamp OFF, filter circuit FC2 becomes effective to block conduction of transistor T2 in the manner hereinbefore described in connection with filter circuit FC1. As will be apparent, the blocking voltage shown in FIG. 6(d) does not decrease below one-half of the peak value of the voltage shown in FIG. 6(e). The transistor of the dim lamp is not blocked completely throughout the entire positive half-cycle but conducts when its emitter-base voltage reaches the value of the voltage on the filter capacitor. This small amount of conduction causes a light glow on the filament of the dim lamp. This feature is desirable as inspection of the lamp will reveal an open circuited or burned out lamp.

Typical values for the circuit components in the blocking voltage circuits in FIG. 4 may be as follows: Resistors R4 and R6 may each have a resistance of 8,000 ohms. Resistors R5 and R7 may each have a resistance of 500 ohms. Resistors R8 and R9 may each have a resistance of 250 ohms. Capacitors C2 and C3 may each have a capacitance value of 10 microfarads. The voltage across each secondary winding S4, S5, S6 and S7 may be 12 volts.

I claim:

1. In a system for indicating closed and open conditions of a circuit control contact, the combination of an electroresponsive indicator, an indicator control circuit and an electrical power supply source therefor, said indicator having an energized condition for indicating the closed condition of said circuit control contact and a deenergized condition for indicating an open condition of said circuit control contact, said indicator control circuit comprising a controllable semi-conductor device, means applying a control voltage from said source to said semi-conductor device to render the latter conducting, a circuit connecting said indicator as a load to said semi-conductor device and including means applying electrical power thereto for control by said semi-conductor device, said semi-conductor device being responsive to opening of said circuit control contact for deenergizing said indicator, and means responsive to deenergization of said indicator for applying a blocking voltage to said semi-conductor device to maintain the latter non-conducting when said circuit control contact is reclosed thereby to maintain said indicator deenergized until said indicator control circuit is reset.

2. The invention defined in claim 1, wherein said blocking voltage applying means comprises a second controllable semi-conductor device, means comprising said source for applying voltages to said second semi-conductor device normally tending to render the latter conducting, means comprising said indicator when energized for maintaining said second semi-conductor device non-conducting and for allowing the latter to conduct when said indicator is deenergized, and means responsive to conduction in said second semi-conductor device for applying said blocking voltage to said first semi-conductor device.

3. The invention defined in claim 2, together with a resetting switch for disconnecting said source voltages from said second semi-conductor device whereby said first semi-conductor device is again rendered conducting to energize said indicator provided said circuit contact has been reclosed.

4. In a system for indicating closed and open conditions of an electrical contact connected in series with a device controlled thereby across a direct current power supply source, the combination of indicator means comprising first and second lamps for indicating the respective closed and open conditions of said contact, indicator control means, and an alternating current power supply source therefor, said indicator control means comprising first and second portions energized from said alternating current source and connected to one another in a flip-flop type arrangement whereby only one of said portions can become effective at a time and the effective portion maintains the other portion ineffective, each said portion comprising a transistor having an emitter and a collector and a base, transformer means for applying a control voltage to the emitter-base junction tending to render said transistor conducting during each alternate half-cycle of the alternating current source, a load circuit connected to the emitter-collector junction for control by said transistor and comprising a secondary winding of said transformer means and one of said lamps, and means connected across said lamp for applying a blocking voltage to the emitter-base junction of the transistor in the other portion of said indicator control means in opposition to the control voltage thereat to render the last mentioned transistor substantially non-conducting, means connecting the contact to be monitored in the transistor load circuit of said first portion of said indicator control means, said transformer means being effective responsive to initial connection of said alternating current source when said contact is closed for causing the transistor in said first portion to conduct current thereby to light the first lamp, each said lamp having a positive temperature coefficient of resistance and a thermal time constant sufficient to prevent cooling of the lamp between the half-waves of current flowing therethrough, and means responsive a time interval after connection of said alternating current source for connecting the latter to the other portion of said indicator control means, and the resistance and thermal time constant of the hot lamp being effective to maintain the blocking voltage half cycles at a value to prevent lighting of said second lamp, and opening of said contact causing extinguishing of said first lamp and lighting of said second lamp.

5. The invention defined in claim 4, together with a resetting switch for disconnecting said alternating current source from said second portion of said indicator control means, said resetting switch being effective upon momentary operation thereof following reclosure of said contact for causing resetting of said indicator control means to its normal condition wherein said first lamp is lighted and said second lamp is extinguished.

6. The invention defined in claim 5, together with a filter circuit in each said blocking voltage applying means for maintaining a blocking voltage on the transistor of the ineffective portion of the indicator control means during the alternate half cycles of the source voltage when the transistors are rendered non-conducting.

7. In a system for indicating closed and open conditions of a plurality of electrical contacts connected in series with a device controlled thereby across a direct current power supply source, an indicator network for each said contact comprising an electroresponsive indicator and an indicator control circuit for each said contact, an alternating current power supply source for energizing said indicator control circuits in parallel, each indicator having a first indicating condition for indicating the closed condition of the associated contact and a second indicating condition for indicating the open condition of the associated contact, means in said indicator control circuits responsive to application of alternating current power when the associated contacts are closed for operating said indicators to exhibit said first indications, means in said indicator control circuits responsive to opening of said associated contacts for operating the associated indicators to exhibit said second indications whereby all the contacts which are open are so indicated by the associated indicators, a memory indicator and a memory indicator control circuit for each said contact, each memory indicator having a first indicating condition for indicating the closed condition of the associated contact and a second indicating condition for indicating the open condition of the associated contact, each memory indicator control circuit comprising means responsive to opening of the associated contact when all the other contacts in series connection therewith are closed for operating the associated memory indicator to exhibit said second indication and for preventing operation of the other memory indicators if their associated contacts subsequently open as long as said first-opening contact remains open.

8. The invention defined in claim 7, wherein each memory indicator comprises an operating coil, and each memory indicator control circuit comprises a capacitor connected in series with said operating coil across the associated contact whereby opening of said contact causes capacitor charging current to flow through said operating coil to energize the same and said charged capacitor prevents further current flow through operating coils of any of the other memory indicators if their associated contacts subsequently open.

9. The invention defined in claim 8, wherein each memory indicator control circuit further comprises a unidirectional current conducting device poled in a direction to conduct discharge current from the associated capacitor in shunt of the associated operating coil when the associated contact is reclosed.

10. The invention defined in claim 7, together with selectively operable resetting means for each said indicator network effective when operated following reclosure of the associated contact to reset both said electroresponsive indicator and said memory indicator to their first indicating conditions.

11. The invention defined in claim 7, together with a group resetting switch effective when operated to reset all of said electroresponsive indicators which have been operated to their second indicating conditions back to their first indicating conditions.

12. In a system for indicating diverse operating conditions of a circuit control element, the combination of:
(a) an electroresponsive indicator;
(b) an indicator control circuit; and
(c) an electrical power supply source therefor;
(d) said indicator having a first indicating condition for indicating a normal condition of said circuit control element and a second indicating condition for indicating an abnormal condition of said circuit control element;
(e) said indicator control circuit comprising a controllable semi-conductor device,
(f) means effective for applying a control voltage from said source to said semi-conductor device tending to render the latter conducting,
(g) a circuit connecting said indicator as a load to said semi-conductor device,
(h) and means normally effective when said circuit control element is in said normal condition for applying a blocking voltage to said semi-conductor device in opposition to said control voltage to maintain said indicator in said first indicating condition,
(i) said circuit control element being effective when operated to said abnormal condition for removing said blocking voltage,
(j) and removal of said blocking voltage allowing said control voltage to render said semi-conductor device conducting sufficient to energize said indicator to indicate said abnormal condition of said circuit control element;
(k) said blocking voltage applying means comprising a second controllable semi-conductor device,
(l) a load circuit connected to said second device and comprising said circuit control element and means applying electrical power thereto for control by said second device,
(m) means effective for applying a control voltage to said second semi-conductor device from said source normally to render said second device conducting when said circuit control element is in its normal condition,
(n) and means connected to said load circuit and being responsive to current flow therethrough for applying said blocking voltage to the first mentioned semi-conductor device to render the latter substantially ineffective,
(o) and said circuit control element being effective when operated to said abnormal condition for interrupting said load circuit to remove said blocking voltage.

13. The invention defined in claim 12, wherein said load circuit further comprises another indicator normally energized when said circuit control element is in its normal condition for indicating such normal condition, and said means connected to said load circuit is connected across said other indicator to apply a blocking voltage to said first mentioned semi-conductor device which is proportional to the voltage drop across said other indicator.

14. The invention defined in claim 13, wherein said supply source comprises an alternating current supply source whereby half-wave rectified current flows through said load circuit, and wherein said blocking voltage applying means comprises an energy storage device for storing electrical energy responsive to each half cycle of said load current thereby to maintain a blocking voltage on said first mentioned semi-conductor device during the alternate half cycle intervals of zero load current.

15. In a fault indicator system for indicating the open condition of an overload contact; the combination of:
an electroresponsive indicator;
an electrical power source;
and a control circuit supplied from said source for operating said electroresponsive indicator and comprising:
a transistor having emitter, collector and base elements;
means applying a control voltage from said source across said emitter and base elements tending to render said transistor conducting;
means comprising said overload contact for applying a blocking voltage across said emitter and base elements overcoming said control voltage to maintain said transistor non-conducting when said overload contact is closed and being responsive to opening of said overload contact to interrupt said blocking voltage whereby said control voltage becomes effective to render said transistor conducting in its emitter and collector elements;
and means responsive to conduction of said transistor for operating said indicator thereby to indicate the opening of said overload contacts.

16. The invention defined in claim 15, wherein said overload contact is connected in a circuit supplied from a second electrical power source;
and said means for applying a blocking voltage comprises a unidirectional current conducting device allowing current flow from the first mentioned source in a direction to bias said transistor off when said overload contact is closed and preventing current flow from said second source in a direction which would bias said transistor on when said overload contact is open thereby to isolate said second source from said transistor.

17. In a system for indicating diverse operating conditions of a circuit control element, the combination of:
an electroresponsive indicator;
a static control circuit for said indicator;
and an electrical alternating current power supply source therefor;
said indicator having a first indicating condition for indicating a normal condition of said circuit control element and a second indicating condition for indicating an abnormal condition of said circuit control element;
said static control circuit comprising a controllable semi-conductor device;
means effective for applying a control voltage from said source to said semi-conductor device tending to render the latter conducting;
a circuit connecting said indicator as a load to said semi-conductor device and including means applying electrical power thereto for control by said semi-conductor device;
and means normally effective when said circuit control element is in said normal condition for applying a blocking voltage to said semi-conductor device in opposition to said control voltage to render the latter ineffective and to maintain said indicator in said first indicating condition;
said circuit control element being effective when operated to said abnormal condition for removing said blocking voltage;
removal of said blocking voltage allowing said control voltage to render said semi-conductor device conducting sufficient to energize said indicator to indicate said abnormal condition of said circuit control element and to maintain said semi-conductor device conducting until said blocking voltage is reapplied by restoration of said circuit control element back to its normal condition;
and said control voltage applying means and said means for applying electrical power to said load circuit and said blocking voltage applying means comprise a transformer having first, second and third secondary windings for energization thereof, respectively.

18. The invention defined in claim 17, together with resetting means for said indicator energizable from said third secondary winding, and selectively operable means for connecting said resetting means to said third secondary winding to reset said indicator.

References Cited by the Examiner

UNITED STATES PATENTS

| 337,796 | 3/86 | Staus | 340—281 |
| 1,197,045 | 9/16 | McFell | 340—281 |
| 2,864,975 | 12/58 | Sumner | 317—148.5 XR |
| 2,985,772 | 5/61 | Pittman et al. | 307—88.5 |
| 2,994,073 | 7/61 | Polovitz | 340—213.1 |
| 3,014,207 | 12/61 | Principale | 340—256 XR |
| 3,019,350 | 1/62 | Gauthey | 307—88.5 |
| 3,118,137 | 1/64 | Vincent | 340—249 |

NEIL C. READ, *Primary Examiner.*

BENNETT G. MILLER, *Examiner.*